United States Patent
Hussain

(10) Patent No.: US 8,811,385 B2
(45) Date of Patent: *Aug. 19, 2014

(54) PROVIDING OPERATION SERVICES FOR NETWORKS VIA OPERATIONS SERVICE SERVERS

(71) Applicant: AT&T Intellectual Property I, LP, Atlanta, GA (US)

(72) Inventor: Altaf Hussain, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/682,850

(22) Filed: Nov. 21, 2012

(65) Prior Publication Data

US 2013/0081108 A1 Mar. 28, 2013

Related U.S. Application Data

(63) Continuation of application No. 11/314,937, filed on Dec. 21, 2005, now Pat. No. 8,340,077.

(51) Int. Cl.
*H04L 12/66* (2006.01)

(52) U.S. Cl.
USPC ............... 370/352; 370/353; 370/395.2

(58) Field of Classification Search
USPC .............. 370/389, 392, 398, 401, 352, 353, 370/395.2; 709/217, 219, 238, 244
See application file for complete search history.

(56) References Cited

U.S. PATENT DOCUMENTS

| | | | |
|---|---|---|---|
| 5,644,354 A | 7/1997 | Thompson et al. | |
| 6,081,518 A | 6/2000 | Bowman-Amuah | |
| 6,104,803 A | 8/2000 | Weser et al. | |
| 7,013,335 B2 | 3/2006 | Barnhouse et al. | |
| 7,020,697 B1 | 3/2006 | Goodman et al. | |
| 7,085,279 B1 | 8/2006 | Kumar et al. | |
| 7,106,706 B1 | 9/2006 | Chaturvedi et al. | |
| 7,152,109 B2 | 12/2006 | Suorsa et al. | |
| 7,283,519 B2 | 10/2007 | Girard | |
| 7,298,751 B1 | 11/2007 | Baker et al. | |
| 7,321,598 B2 | 1/2008 | Blanchet et al. | |
| 7,403,946 B1 | 7/2008 | Taylor | |
| 7,408,941 B2 | 8/2008 | Martini et al. | |
| 7,415,509 B1 | 8/2008 | Kaltenmark et al. | |
| 7,447,203 B2 | 11/2008 | Chen et al. | |
| 7,660,324 B2 | 2/2010 | Oguchi et al. | |
| 7,788,401 B2 * | 8/2010 | Hussain | 709/238 |
| 7,916,740 B2 | 3/2011 | Zheng | |
| 7,924,816 B2 | 4/2011 | Gunasekar et al. | |
| 8,077,721 B2 | 12/2011 | Raszuk et al. | |
| 8,340,077 B2 * | 12/2012 | Hussain | 370/352 |
| 8,392,502 B2 * | 3/2013 | Henrikson et al. | 709/204 |
| 2003/0212991 A1 | 11/2003 | Mahajan | |
| 2005/0198231 A1 | 9/2005 | Gasca et al. | |
| 2006/0013147 A1 | 1/2006 | Terpstra et al. | |
| 2006/0117092 A1 | 6/2006 | Yanagi et al. | |
| 2007/0171923 A1 | 7/2007 | Eisner et al. | |

* cited by examiner

*Primary Examiner* — Brian O'Connor
(74) *Attorney, Agent, or Firm* — Parks IP Law LLC

(57) ABSTRACT

Systems and methods of provide operations services for networks through an operations service switch. Multiple customers of the operations service may obtain operations service through the operations switch, as opposed to implementing operations services themselves. Operations service servers are in communication with the operations switch so as to be available for providing operations services to the customer accessing the operations switch. The operations switch may then establish communication links between the customer networks and the operations service servers to facilitate a centralized manner of providing operations services to the customer networks.

20 Claims, 6 Drawing Sheets

PROVIDING OPERATION SERVICES FOR NETWORKS VIA OPERATIONS SERVICE SERVERS

RELATED APPLICATIONS

The present application claims priority to U.S. Provisional Application 60/690,589 filed on Jun. 15, 2005, and entitled "IP Operations Management Services to Support Operations Services or Feature Packages," which is incorporated herein, and the present application claims priority to U.S. Provisional Application 60/690,577 filed on Jun. 15, 2005, and entitled "Operations Switch—A New Technology to Support Operations Services or Feature Packages," which is incorporated herein.

TECHNICAL FIELD

The present application relates to provisioning operation service for networks. More particularly, the present application relates to provisioning of operation services by utilizing operation service servers that establish communication paths to networks requiring service.

BACKGROUND

Entities that operate telecommunications and computing networks must monitor and maintain those networks. Such entities include multimedia communication service providers, multimedia communication network providers, enterprise customer services and networks, large/small business services and networks, and consumer services, and home networks. Many of the operating tasks (i.e., provisioning, activating, and monitoring) and maintenance tasks are common among the networks of the various entities. However, each of these entities generally performs the operation and maintenance themselves, using various software tools to complete the operating and maintenance tasks. Often, the entities responsible for the networks develop their own software and maintain personnel responsible for handling the operations services. The computer systems, software tools, and personnel involved in handling the operations services for a network require a significant investment on the part of the each of the entities that own the networks.

When new technology is to be added to the network, the entities are forced to develop new operations support systems or modify existing ones to fully support the new technology. This results in a delay in the implementation of new technology and a delay in the delivery of new services to customers. In this context, customers may include those customers of a service provider network, customers of entities providing service to an enterprise network and/or large/small business network owned by the customer, as well as customers of entities providing service to a consumer/home network. Ultimately, there may be a significant loss of revenue associated with such delays in addition to the costs associated with providing the operations support systems for the new technology.

SUMMARY

Exemplary embodiments address these issues and others by establishing devices, systems, and methods of providing operations services for networks via operations service servers. Multiple customers of the operations service, such as customers of a service provider network and/or customers of entities who provide services for a customer owned network, may obtain operations service through one or more operations switches, as opposed to implementing operations services themselves. Operations for which service is provided include but are not limited to administering, provisioning, activating, securing, monitoring, maintaining, and accounting. Such operations services may be categorized as operation service applications and operations service features, where operations service features are subsets of an operations service application, such as a monitoring feature being a subset of a maintenance application. Furthermore, an assortment of operations service servers are in communication with the one or more operations switches so as to be available for providing operations services to the customer accessing the operations switch. The operations service servers may then establish communication links to the customer networks to begin providing the operations services such as in response to instructions to establish the links that are provided by an operations switch that has received the request for operations services from customers.

One embodiment is a device for providing management of operation services of networks. The device includes a network connection and processor that implements an application to receive via the network connection requests for operations service from a first network address, the request specifying an operations service to provide to a second network address, and to establish a communication link to the second network address and to begin providing the requested operations service to the second network address.

Another embodiment is a method of providing operation services of networks. The method involves receiving requests for operations services at an operation services server via a network connection, the request originating from a first network address. The request specifies an operations service and a second network address and the method further involves establishing a communication link from the operations service server to the second network address in correspondence with the request and initiating operations service over the communication link to the second network address.

Another embodiment is a computer readable medium that contains instructions that when implemented perform operations including receiving a request for operations services from a first network address at an operations service server, the request specifying a second network address. The operations further include establishing a communication link by the operations service server accessing the second network address over a data network. The operations further include initiating the requested operations service by, the operations service server over the communication link.

DETAILED DESCRIPTION

Exemplary embodiments provide for the centralized establishment of operations services for customer networks from various operations service providers. An operations switch provides the centralized point of management and is interconnected to the operations service servers and the customer networks. The operations switch establishes communication links between the operations service servers and the customer networks so that operations service requested by customers is provided, and the operations switch provides an interface for customers to access details and otherwise monitor the operations services being provided.

Figure 1:
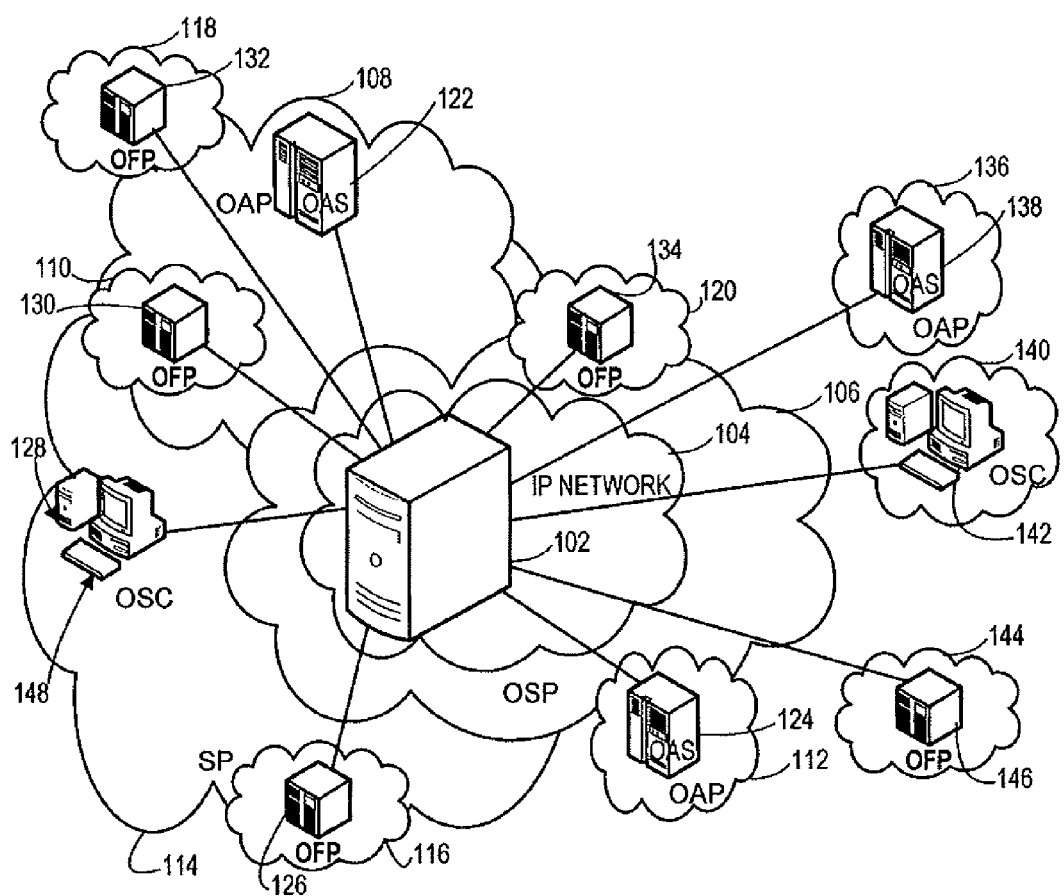
FIG. 1 shows one example of the interconnection of an operations switch to customers and to operations service providers over various overlapping network layers.

FIG. 1 shows one example of the interconnection between an operations switch (OSW) 102 of an operations service provider (OSP) network 106 and operations service servers and customer networks. As can be seen, the OSW 102 serves as a centralized point of control and management for operations services being provided to customers. The OSW 102 as discussed herein may be implemented as an Internet Protocol softswitch such as the Siemens hiQ 8000 and Lucent Network Controller (LNC) manufactured by Siemens and Lucent, respectively and adapted to perform the functions set forth herein. In the embodiment shown in FIG. 1, the OSW 102 resides within an Internet Protocol (IP) network 104 for purposes of communicating with external computer systems including those of customers and external provider entities.

As shown, the OSW 102 interconnects with servers and/or terminals of networks outside the OSP network 106. The OSP network 106 of this embodiment is a network that is owned and operated by the OSP that is providing the OSW 102 for access by customers in order to provide for the establishment of operations services to the customer from operations service servers of other provider entities. Specifically, the OSW 102 acts as a mechanism for establishing operations service between operations service customers (OSC) 140, 148 and the provider entities include operations application providers (OAP) 108, 112, and 136 and operations feature providers (OFP) 110, 116, 118, 120, and 144. Additionally, the OSW 102 may include billing features to monitor the operations services being provided to a customer and to generate billing data based on monitoring of those operations services being provided.

The OSCs 140, 148 are end users needing operations services, such as configuring and monitoring their network, network devices or services at the customer premises. For example, an OSC may be a residential user needing operations services for the network at their home. Likewise, the OSC may be a business user needing operations services for the enterprise or small business network. The operations services may be provided to the network via an operations terminal (OT) 128, 142 located within the network. The OT 128, 142 may be a personal computer or other electronic device capable of exposing the OSC network to external provider networks, such as via voice and/or video. The OT 128, 142 is connected to a provider network via a wide area network and protocol, such as via Internet Protocol routing via a broadband Internet connection.

The OSC network 140 may be a stand-alone network not associated with a particular service provider for establishing network connectivity. For example, the OSC 140 may itself be a service provider that provides network connectivity for its own customers, but for purposes of the current embodiment, the service provider OSC 140 is a customer of the OSP 106 and the provider entities including OAPs and OFPs. Thus, rather than the service provider OSC 140 being required to implement its own operations services to manage its own network, the service provider OSC 140 may rely upon the operations services being provided from the OAPs and OFPs once established by the OSP 106 via the OSC 102.

The OSC network 148 may reside as a node of a service provider (SP) network 114, where the OSC 148 is a customer of the SP 114 while also being a customer of the OSP 106 for purposes of receiving operations services. It will be appreciated that the SP 114 and OSP 106 may merge as one network where the SP and OSP entity is one and the same. The SP 114 may be any service provider, such as a voice over IP (VoIP) provider, a Digital Subscriber Loop (DSL) provider, or any other communications or non-communications provider who may require operations services for its network.

With respect to the operations services to be provided to the OSCs (and/or SPs), operations service servers are present within the networks of the external provider entities. As discussed above, the external providers may include OAPs. Each OAP has one or more operation application servers (OAS) that provide the application functionality of the operations service being subscribed to by a customer of the OSP. As shown OAP 108 operates OAS 122, OAP 112 operates OAS 124, and OAP 136 operates OAS 138. It will be appreciated that the operations application services provided by the OAPs may differ such that the OAP is chosen for a particular customer subscription based on the particular operations application service that it provides, or may be the same such that the OAP is chosen based on some criteria such as price to the customer or commission to be paid to the OSC 106.

Also with respect to the operations services to be provided to the OSCs and/or SPs, the external providers may also include OFPs. Each OFP has one or more operation feature servers (OFS) that provide the feature functionality of the operations service being subscribed to by a customer of the OSP. As shown OFP 110 operations OFS 130, OFP 116 operates OFS 126, OFP 118 operates OFS 132, OFP 120 operates OFS 134, and OFP 144 operates OFS 146. As with the OAPs, it will be appreciated that the operations feature services provided by the OFPs may differ such that the OFP is chosen for a particular customer subscription based on the particular operations feature service that it provides, or may be the same such that the OFP is chosen based on some criteria such as price to the customer or commission to be paid to the OSC 106.

Figure 1B:
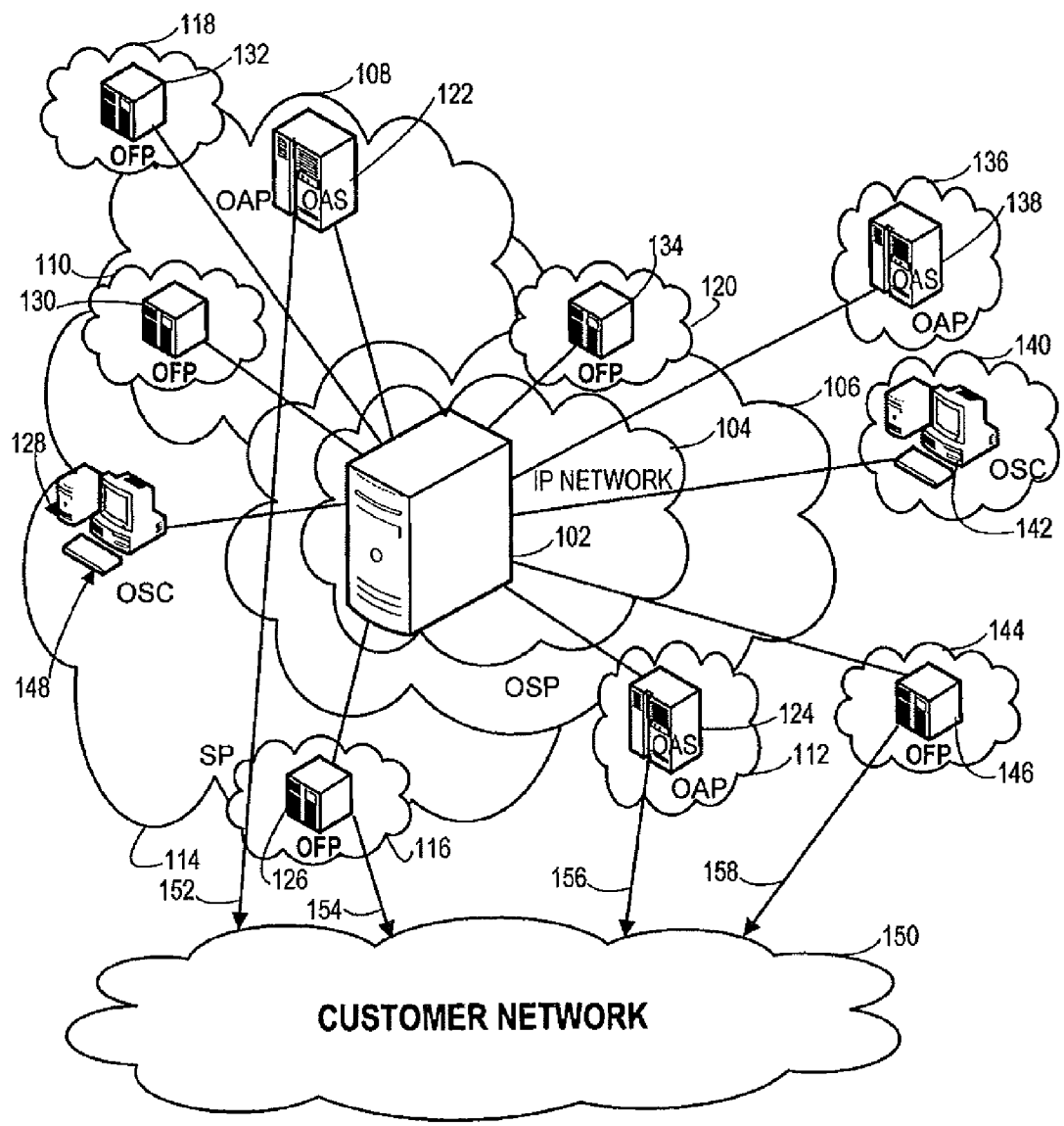
FIG. 1b shows one example of the interconnection of an operations switch to customers and to operations service providers over various overlapping network layers in order to provision operations services for the customers.

As discussed below, the OSW 102 provisions the operations services including operation applications and operation features by receiving requests from the customer via the OT 128 or other computing device and then establishes links between the network of the customer that requires operations services and the operations application servers and operations feature servers. FIG. 1b shows one example where the OSW 102 has received a request from the OT 128 and has responded by: establishing link 152 between customer network 150 and the OAS 122 to provision one or more operation applications, establishing link 154 between customer network 150 and OFS 126 to provision one or more operation features, by establishing link 156 between customer network 150 and OAS 124 to provision one or more other operation applications, and by establishing link 158 between customer network 150 and OFS 146 to provision one or more other operation features.

Many different operations services may be provided. For example, the operation application services of the OAPs may include such things as service ordering applications, where service ordering applications perform tasks including Service Order, Service Fulfillment and Service Activation. The operation application services may further include fault management applications, where fault management applications perform tasks including Monitoring Network Performance (such as performance parameters of individual components or of a network as a whole), Network Capacity (such as capacity of individual components or of a network as a whole) and Network Faults. Additional operation application services may include Capacity Management Applications, Asset/Inventory Management of network equipment as well as provisioning, configuring, and activating of network equipment.

Likewise, the operation feature services of the OFPs, which are ultimately features utilized by applications also being provided to the customers, may include such things as monitoring capacity of a specific network where monitoring capacity involves measuring how much data per unit time can be transferred and may be performed as a subset of a maintenance application such as one being provided by an OAP. The operation feature services may further include monitoring of network equipment of a specific network, where monitoring of network equipment involves determining whether the network equipment has a failed or other status. Additional operation feature services may include Order Activations as part of Configuration management Applications.

The operations services may be common among technologies employed by customers. Thus, the operations applications and features may be configured to address the issues of one technology versus another. Accordingly, the OAPs and OFPs may specialize for the network operations services of particular customer networks implementing particular technologies for which operations services are needed. Furthermore, the OSPs may also specialize for the network operations services of particular industries such that the OAPs and OFPs that the OSPs associate with a customer are those that specialize for the industry to which the customer belongs.

Figure 2:
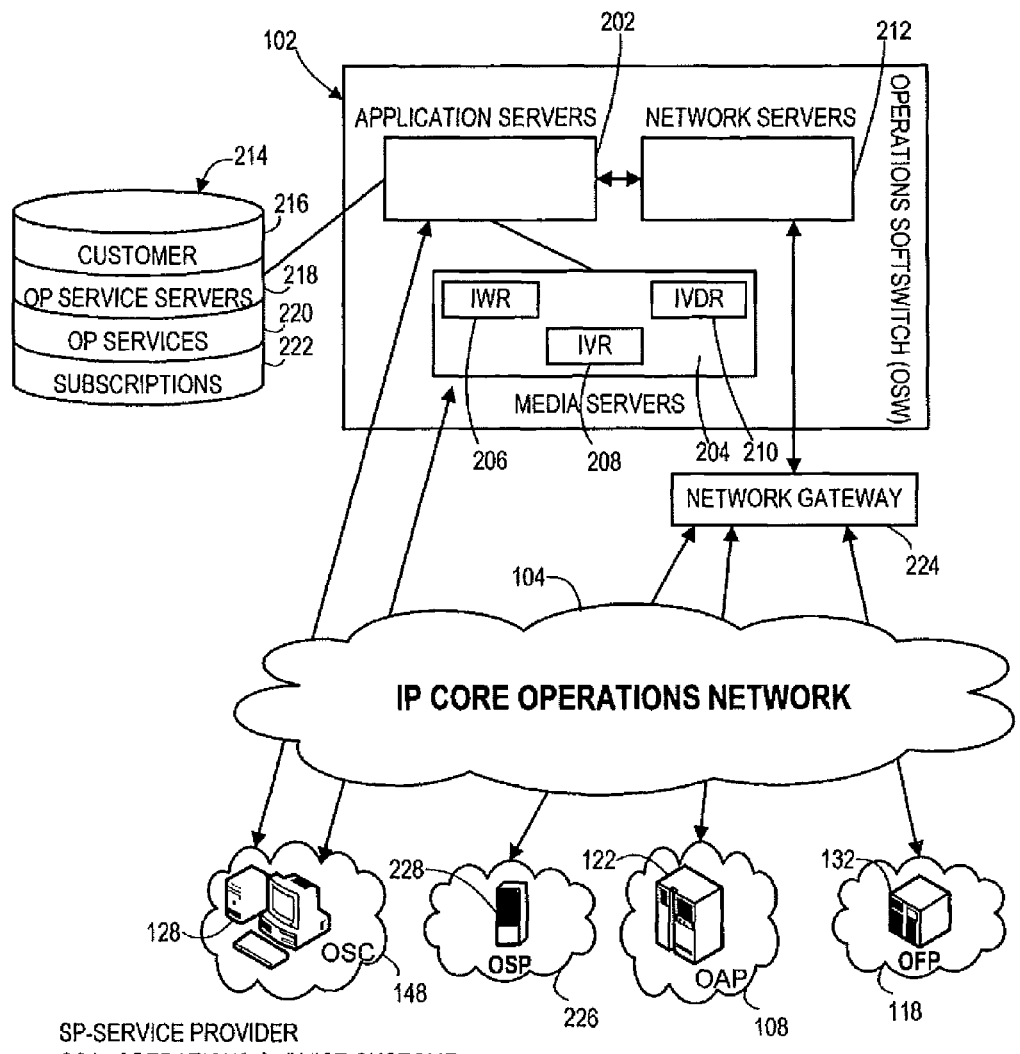
FIG. 2 shows one example of the components of an operations switch of FIG. 1.

FIG. 2 shows one embodiment of OSW 102 in greater detail. The OSW 102 includes three separate servers. A first server is an application server 202. A second server, which may itself include multiple server functions, is a media server 204. A third server is a network server 212. The OSW 102 functions to provide an access interface to the OSCs, to provide a trunk interface to the OFPs, OAPs, and to other OSPs, to interface to various media including voice, video, and data to be used for monitoring of a network and the operations services being provided thereto by a customer, to interface to the customer network or to a service provider network of the customer, and to provide network security features.

The application server 202 operates to establish the subscriptions of customers for the operations services. The application server 202 interacts with the media server 204 to interface with the customers and to allow the customers to make selections for Resource Selection (Centralized Allocation, Geographical Location Selection) and media selection (Voice, Video and/or Web) of operations services and to monitor those operations services being provided. The application server 202 interacts with the network servers 212 to establish the connection between the operations service servers and the OT of the customers so that the operations services can be provided from the operations service servers.

Additionally, the application server 202 maintains one or more databases 214. The one or more databases 214 include a database segment 216 that stores information about the customers of the OSP, including the network address of each of the OTs for which operations service will be provided. The database segment 218 stores information about the operations service servers, and corresponding network addresses, that are available to customers via the OSP including all of the OASs and OFSs of the external providers. The database segment 220 stores the operations services that are available for selection by customers and that are provided by the operations service servers of segment 218, where the operations services may be provided by multiple operation service servers of segment 218 and wherein either the customer or the OSC may choose which operations service server is to be included for the subscription. Database segment 222 stores the subscription associations for each customer, where each subscription associates a customer OT with an operations service server for providing the operations service desired by the customer to the OT and the corresponding customer network.

The application server 202 functions to provide the customer with selections for management services of the operations services being provided, including network configuration, network fault detection, network performance detection, network capacity detection, network security detection (such as monitoring access attempts to a customer network including log-in validation), network account management, and customer installation management. The application server 202 may provide for prioritization of the operations services being provided. Furthermore, the application server 202 may provide for announcements via the media servers 204, including via the web IWR 206, voice IVR 208 or video IVDR 210. Furthermore, the application server 202 may provide prompts and greetings for customers accessing their operation services account, and may provide accounting and billing functions including providing such information to the customer for review.

The media server 204 functions to provide centralized allocation and geographical location selection for customers. Additionally, the media server 204 provides for interactive voice response (IVR 208), interactive video response (IVDR 210), and/or interactive web response (IWR 206) for exchanging information with the customer regarding the operations services being provided, including the operation applications and operation features provided from the provider entities.

The network server 212 functions to provide centralized routing, such as IP routing, including transaction based routing, and policy based control. Specifically, the network server 212 may map the OSC location register to the operations service servers to provide the operations services to the OSCs. The network server 212 will with multiple application servers 202 to route a call to a specific destination OSC 106 (i.e. multiple OTs). A network server 212 will be able to serve multiple distributed application servers 202 within an OSW 102.

The OSW 102 communicates with both the operations service servers and the OTs of the customer networks. As shown, the OSC 148 may communicate with the OSW 102 via a communication link between the OT 128 and the media server 204 and/or directly with the application server 202 such as via an application-specific user interface. Such communications may be to subscribe to operations services and then to monitor the provisioning of those services, including reviewing account and billing information. Likewise, the OSW 102 may communicate with the operations service servers, including the OASs and OFSs by the network server 212 routing communications via a network gateway 224 that leads to the network core 104 where the OSW resides. The network core 104, such as an IP core, may then be a network capable of routing the communications from the OSW 102 to the individual networks and servers of the provider entities (i.e., OAS 122 of OAP 108, OFS 132 of OFP 118), as well as to other OSWs 228 and of the same or other OSPs 226.

Figure 3:
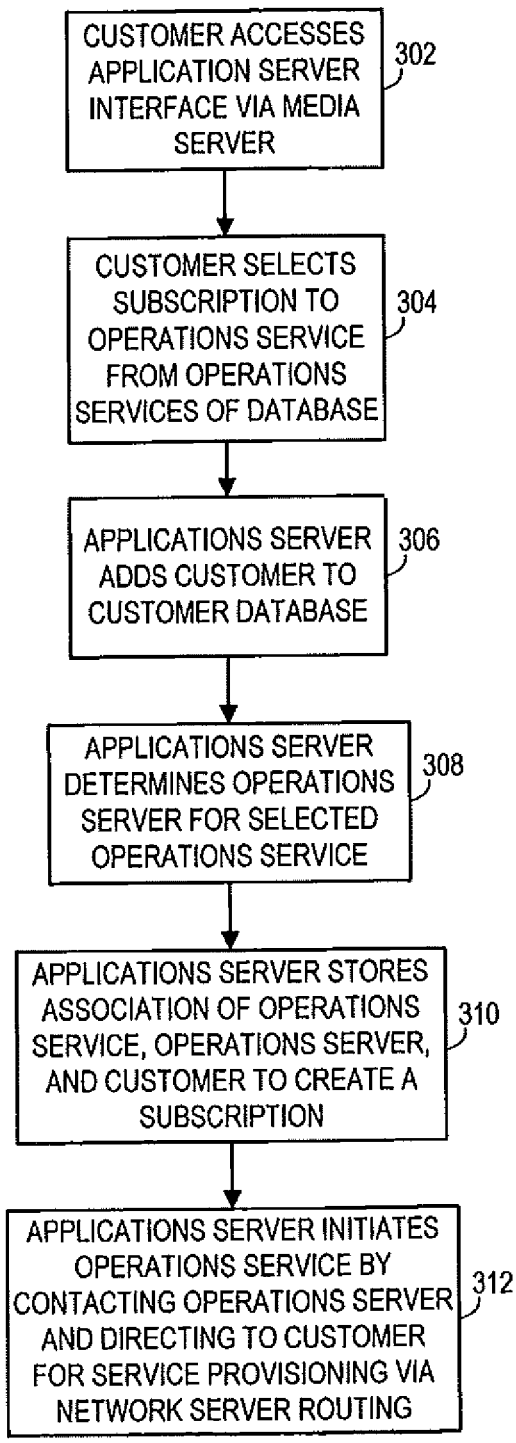
FIG. 3 shows one example of the operations being performed by the operations switch of FIGS. 1 and 1b to establish an operations service for customers.

FIG. 3 illustrates one example of the operations of the OSW 102 to establish the operations services for customer networks. Initially, the customer accesses the OSW 102 at access operation 302, such as by contacting the media server 204 via the web, voice, or video in order to create a subscription for services. The customer then selects the subscription to operations services from the set of operations services made available by the OSW 104 and as defined in the operations services database that is being maintained at selection operation 304.

Upon the application server 202 having received the selection, either directly or through the interaction with the media servers 204, the application server adds the customer to the customer database at customer operation 306. The application server 202 then determines the operations service server for the selected operations service at server operation 308. For example, the application server 202 may find that the customer has chosen an operations application or feature to which there is only a single operations application or feature provider. In that case, the operations service server of that one provider is determined to be the operations service server for this customer request. As another example, the application server 202 may find that the customer has chosen an operations application or feature to which there are multiple operations application or feature providers. In that case, the applications server 202 may apply particular criteria to determine which operations service server should be selected, where the criteria may be to select the provider entity offering the best price for the customer where the provider entities may charge different rates for the same service, or may be to select the provider entity offering the best commission for the OSP that is associating the customer with the operations service.

Upon the application server 202 having determined the appropriate operations service server, the application server 202 creates a subscription association at subscription operation 310. Here, the association includes the operations service selected, the operations service server that has been determined to be the best choice for providing the selected operations service, and the customer information. Upon the subscription being created, the application server 202 then initiates the provisioning of the operations service at routing operation 312. The operations service is provisioned by causing the network server 212 to route a request to the relevant operations service server for the subscription to then direct the operations service server to begin providing the operations service to the customer network of the subscription.

The functions of the various servers including those of the OSW 102 of FIG. 3 and also those of the various operations service servers may be embodied as a computer readable medium, such as storage including magnetic, electronic, and optical formats as well as propagated signals traveling via wired or wireless connections.

Figure 4:
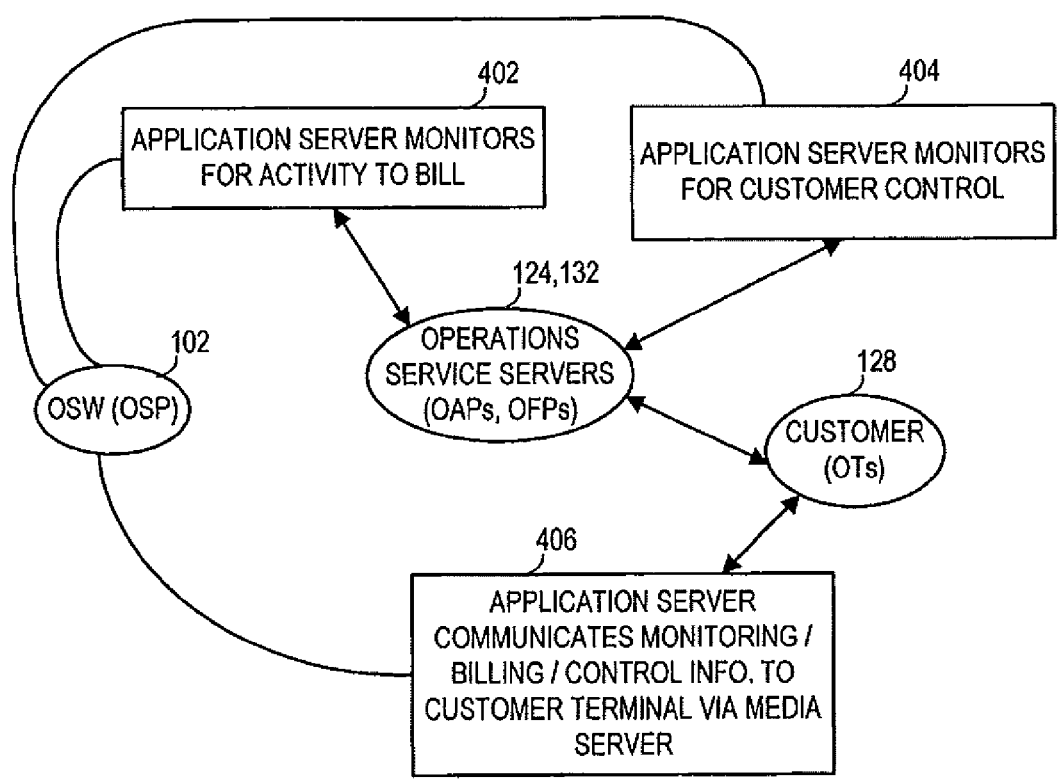
FIG. 4 shows one example of the operations being performed by the operations switch upon the establishment of operations service for customers and the relationship of those operations to the operations service servers and the customer terminal.

FIG. 4 shows an example of the interaction that may occur between the OSW 102, the operations service servers 124, 132, and the customer network 128 while the operations service is being provisioned. At monitoring operation 402, the OSW 102 includes the application server 202 monitoring the operations service servers 124, 132 that are providing operations services for a particular customer in order to determine what the customer should be billed, such as where the operations service is not a fixed charge but varies depending upon the actions taken on behalf of the customer. At monitoring operation 404, the application server 202 monitors for any desired customer control of operations service that may be received and implements any change of the operations service due to the customer control by communicating with the relevant operations service server 124, 132.

The OSW 102 also maintains communications with the customer network 128 by allowing the customer network 128 to access the application server 202 such as via the media server 204 at communication operation 406. Here, the customer may request monitoring information about the operations services being provided, such as to view the manner in which faults have been detected and handled, view the current capacity of the network, view the current status of various network equipment, etc. Furthermore, the customer may request or otherwise be provided with billing information, such as a current account balance. Additionally, the customer may submit control information such as to manipulate the operations service being provided, and where the control information may then be implemented as discussed above for monitor operation 404.

It will be appreciated that through the OSW 102, the customers may request operations services be provided for their networks while the OSW 102 than establishes the requested services by calling upon the appropriate operations service servers available to the OSW 102. Thus, it will further be appreciated that the OSW 102 may establish the same or similar operations services for multiple customers, thereby taking advantage of the ability of the provider entities to offer operations services to multiple networks while providing the multiple customers a centralized point of management for the operations services being provided. The customers are thereby relieved from having to implement such operations services themselves.

Figure 5:
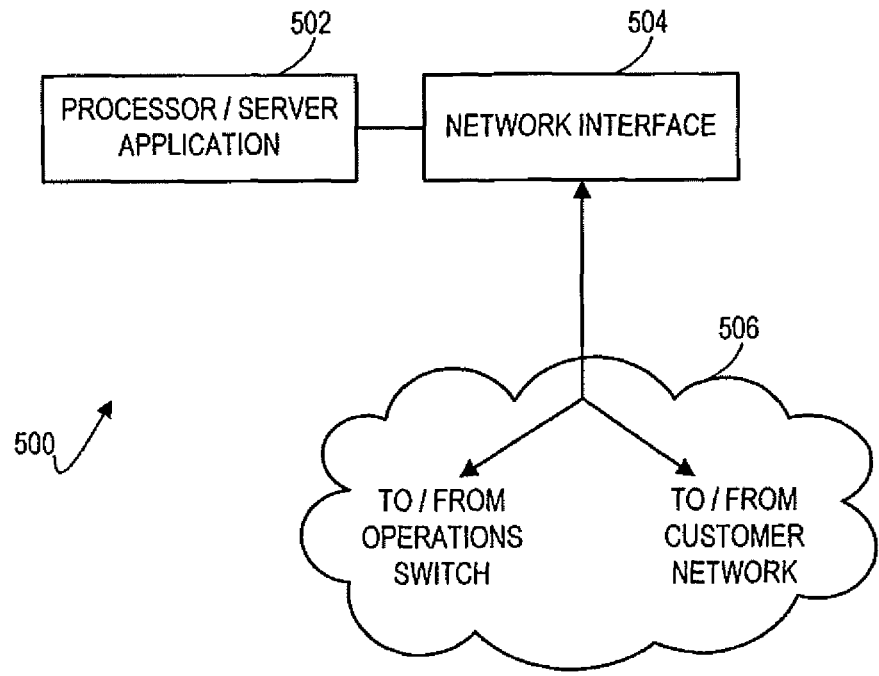
FIG. 5 shows one example of an operations service server.

FIG. 5 shows one exemplary embodiment of an operations service server 500 in accordance with the systems discussed above. The operations service server 500 is a computing system that includes a processor 502 implementing a server application. The processor 502 may be a general purpose programmable processor where the server application is a software application residing on a storage device or in memory that is either external to or internal to the processor 502. Additionally, the operations service server 500 includes a network interface 504, such as an Ethernet interface or other type of interface that couples the operations service server 500 to external networks 506. Within the external networks 506, the operations service server 500 receives requests and provides acknowledgements to the operations switches discussed above. Additionally, the operations service servers establish communication links to customer networks and initiating the operations services over the communication links formed in the external networks 506.

Figure 6:
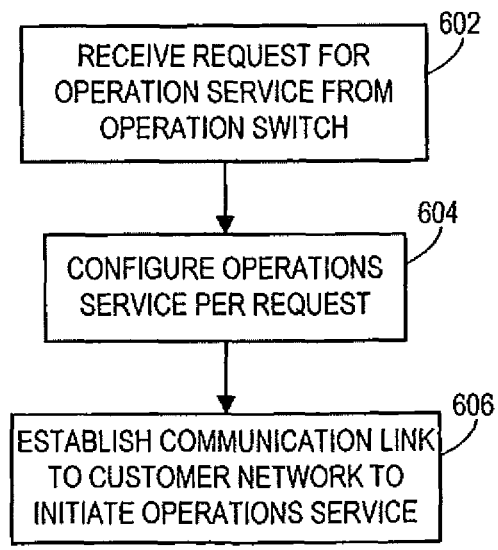
FIG. 6 shows on example of an operational flow of the operations service server of FIG. 5.

FIG. 6 shows on example of an operational flow of an operations service server 500. The operations service server 500 receives an incoming request from the network 506 where the request has originated from an operations switch at a first network address, such as those operation switches discussed above. Presumably, a customer has established communication with the operations switch to request a particular operations service. The request received by the operations service server 500 at request operation 602 is the direct result of that request to the operations switch by the customer. The request provides information necessary for the operations service server 500 to provide the requested service. Namely, the request provides a second network address that corresponds to an entry point to the customer network. Additionally, the request provides an identification of the particular service that has been requested and/or any parameters necessary for providing the service, such as service options that have been pre-selected by the customer when communicating with the operations switch.

After having received the request, the operations service server 500 then configures the operations service per the request at configuration operation 604, including implementing the service application necessary to provide the functions of the requested service in accordance with any options or other configuration information already specified by the request. The operations service server 500 then establishes a communication link by initiating communications with the customer network at the second network address and upon reaching a live address, then beginning the operations service that has been requested over the established communication link at service operation 606. The communication link may be an IP based point-to-point communication that continues so long as the operations service remains active, i.e., until the operations service server receives another request for termination of the operations service or until a natural expiration of the service as may have already been specified in the initial request. Examples of the operations services including operation applications and operation features that may be provided by the operations service server 500 have been set forth above.

While the invention has been particularly shown and described with reference to various embodiments thereof, it will be understood by those skilled in the art that various other changes in the form and details may be made therein without departing from the spirit and scope of the invention.

What is claimed is:

1. An operations service server comprising:
    a processor; and
    a memory having stored thereon instructions which, when executed by the processor, cause the processor to perform operations comprising:
        receiving a request from an operations switch associated with a first network address, wherein the request includes a second network address associated with a customer network and specifies an operations service to provide to the customer network associated with the second network address, wherein the second network address is an IP address;
        configuring the operations service based on the request;
        causing a second communication link to the customer network to be established, wherein the second communication link is an IP based point-to-point link between the operations service server and the second network address that remains active until a request for termination of the operations service is received by the operations service server; and
        causing the operations service to be provided to the customer network at the second network address over the second communication link.

2. The operations service server of claim 1, wherein the operations service comprises a fault management application that handles faults within the customer network associated with the second network address.

3. The operations service server of claim 1, wherein the operations service comprises a security management application that maintains security for access attempts to the customer network associated with the second network address.

4. The operations service server of claim 1, wherein the operations service comprises an asset and inventory management application that handles asset and inventory management tasks for the customer network associated with the second network address.

5. The operations service server of claim 1, wherein the operations service comprises a provisioning, a configuration, and an activation feature for network equipment of the customer network associated with the second network address.

6. The operations service server of claim 1, wherein the customer network associated with the second network address corresponds to a network of a plurality of customer networks that include service provider networks operated by service providers.

7. The operations service server of claim 1, wherein the customer network associated with the second network address corresponds to a network of a plurality of customer networks operated by users of service providers.

8. A method, comprising:
    receiving, by a processor in an operations service server, a request from an operations switch associated with a first network address, wherein the request includes a second network address associated with a customer network and specifies an operations service to provide to the customer network associated with the second network address, wherein the second network address is an IP address;
    configuring, by the processor, the operations service based on the request; and
    causing a communication link to the customer network to be established, wherein the communication link is an IP based point-to-point link between the operations service server and the second network address that remains active until a request for termination of the operations service is received by the operations service server; and
    causing the operations service to be provided over the communication link to the customer network at the second network address.

9. The method of claim 8, wherein providing the operations service over the communications link to the customer network at the second network address comprises providing a fault management service that handles faults within the customer network associated with the second network address.

10. The method of claim 8, wherein providing the operations service over the communications link to the customer network at the second network address comprises providing a security management service that maintains security for access attempts to the customer network associated with the second network address.

11. The method of claim 8, wherein providing the operations service over the communications link to the customer network at the second network address comprises providing an asset and inventory management service for the asset and inventory management of network equipment of the customer network.

12. The method of claim 8, wherein providing the operations service over the communications link to the customer network at the second network address comprises providing a service for provisioning, configuring, and activating network equipment of the customer network.

13. The method of claim 8, wherein the customer network associated with the second network address corresponds to a network of a plurality of customer networks that include service provider networks operated by service providers.

14. The method of claim 8, wherein the customer network associated with the second network address corresponds to a network of a plurality of customer networks operated by users of service providers.

15. A non-transitory computer readable storage medium having encoded thereon computer readable instructions that, when executed by a processor of an operations service server, cause the processor to perform operations according to the instructions comprising:

receiving, from an operations switch associated with a first network address, a request, the request including a second network address associated with a customer network and specifying an operations service to provide to the customer network associated with the second network address, wherein the second network address is an IP address;

configuring the operations service based on the request;

causing a communication link to the customer network to be established, wherein the communication link is an IP based point-to-point link between the operations service server and the second network address that remains active until a request for termination of the operations service is received by the operations service server; and causing the operations service to be provided over the communication link to the customer network at the second network address.

16. The non-transitory computer readable storage medium of claim 15, wherein the instructions for providing the operations service further comprise instructions that, when executed by the processor, cause the processor to perform providing a fault management service that handles faults within the customer network associated with the second network address.

17. The non-transitory computer readable storage medium of claim 15, wherein the instructions for providing the operations service further comprise instructions that, when executed by the processor, cause the processor to perform providing a security management service that maintains security for access attempts to the customer network associated with the second network address.

18. The non-transitory computer readable storage medium of claim 15, wherein the instructions for providing the operations service further comprise instructions that, when executed by the processor, cause the processor to perform providing an asset and inventory management service for the asset and inventory management of network equipment of the customer network.

19. The non-transitory computer readable storage medium of claim 15, wherein the instructions for providing the operations service further comprise instructions that, when executed by the processor, cause the processor to perform providing a service for provisioning, configuring, and activating network equipment of the customer network.

20. The non-transitory computer readable storage medium of claim 15, wherein the customer network associated with the second network address corresponds to a network of a plurality of customer networks including service provider networks operated by service providers and networks operated by users of service providers.

* * * * *